(12) United States Patent
Bleau et al.

(10) Patent No.: US 7,839,451 B2
(45) Date of Patent: *Nov. 23, 2010

(54) APPARATUSES AND METHODS FOR A CAMERA HEAD ENCLOSURE DEVICE FOR FACILITATING IMPROVED IMAGING

(75) Inventors: Charles Bleau, Atlanta, GA (US); Mark P. McJunkin, Atlanta, GA (US); Dean Quoc Nguyen, Atlanta, GA (US); Garry Thomas Motter, Stone Mountain, GA (US); Raymond C. DuVarney, Lilburn, GA (US)

(73) Assignee: Scimeasure Analytical Systems, Inc., Decatur, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/272,245

(22) Filed: Nov. 17, 2008

(65) Prior Publication Data

US 2009/0073308 A1    Mar. 19, 2009

Related U.S. Application Data

(63) Continuation of application No. 10/982,064, filed on Nov. 5, 2004, now Pat. No. 7,518,654.

(60) Provisional application No. 60/518,262, filed on Nov. 7, 2003.

(51) Int. Cl.
  *H04N 5/225* (2006.01)
(52) U.S. Cl. ................. 348/373; 348/374; 348/375; 348/340
(58) Field of Classification Search ............ 348/340, 348/373–376; 396/529
  See application file for complete search history.

(56) References Cited

U.S. PATENT DOCUMENTS 3,930,720 A    1/1976    Uesugi (Continued)

OTHER PUBLICATIONS

Ludl Electronic Products Ltd., It Looks Different . . . "The MAC 5000 system is the new standard in modular automation for scientific applications.", Retrieved Jan. 21, 2005 from Internet Site http://www.ludl.com/Products/BioScience/MAC5000/Mac5000Start.html, p. 1 of 1.

(Continued)

*Primary Examiner*—David L Ometz
*Assistant Examiner*—Antoinette T Spinks
(74) *Attorney, Agent, or Firm*—Kilpatrick Stockton LLP

(57) ABSTRACT

A camera head enclosure apparatus configured to allow the interchangeability of photo-electric pixel arrays used in various applications is provided. A personality plate configured to receive and secure a photo-electric pixel array of a particular configuration provided on a chip is provided. The exemplary embodiments allow a user to interchange photo-electric pixel arrays, and personality plates, while using the same camera head enclosure, thus enabling the camera head enclosure to be adapted to a different photo-electric pixel array eliminating the need to custom make camera head enclosures for each application. The camera head enclosure apparatus may include carriers configured to hold circuit boards associated with the particular photo-electric pixel array selected. Additionally or alternatively, the camera head enclosure apparatus may include an aperture adjustment assembly permitting alignment of the camera aperture with the photo-electric pixel array providing the capability to accommodate different types, sizes, and configurations of photo-electric pixel arrays.

14 Claims, 9 Drawing Sheets

U.S. PATENT DOCUMENTS

| | | |
|---|---|---|
| 4,594,613 A | 6/1986 | Shinbori et al. |
| 5,040,068 A | 8/1991 | Parulski et al. |
| 5,602,721 A | 2/1997 | Slade et al. |
| 5,731,834 A | 3/1998 | Huot et al. |
| 5,838,548 A | 11/1998 | Matz et al. |
| 6,038,126 A | 3/2000 | Weng |
| 6,628,339 B1 | 9/2003 | Ferland et al. |
| 6,698,851 B1 | 3/2004 | Ludl |
| 6,956,615 B2 | 10/2005 | Nakagishi et al. |
| 2005/0285973 A1 | 12/2005 | Singh et al. |

OTHER PUBLICATIONS

Ludl Electronic Products Ltd., Mac 5000 Controller System, Catalog, Retrieved Jan. 21, 2005 from Internet Site http://www.ludl.com/Products/PDFspecs/Mac%205000%20Catalog%202003.pdf, pp. 1-20.

Office Communication from corresponding U.S. Appl. No. 10/982,064 dated Jun. 26, 2008.

APPARATUSES AND METHODS FOR A CAMERA HEAD ENCLOSURE DEVICE FOR FACILITATING IMPROVED IMAGING

CROSS-REFERENCE TO RELATED APPLICATIONS

This application is a continuation of Ser. No. 10/982,064 filed Nov. 5, 2004 now U.S. Pat. No. 7,518,654 which claims priority from provisional application No. 60/518,262 entitled "Camera Head Enclosure," which was filed on Nov. 7, 2003 and which is hereby incorporated by reference.

FIELD OF THE INVENTION

This invention relates to a camera head enclosure apparatus that can be used to house a camera to receive and image a source of light in a wide variety of applications. The apparatus encloses and protects a camera's charge-coupled device (CCD) or other photo-electric pixel array, and one or more related circuit boards, for use in receiving and imaging a source of light to generate electronic signals for use by an external device. The camera head apparatus can be used for optical imaging in a wide range of applications including astronomy, medicine, manufacturing, and other fields.

BACKGROUND OF THE INVENTION

CCD arrays have been in commercial use for several years. Such devices are essentially two-dimensional arrays of photodiodes or the like, that each are capable of generating an electrical signal in response to receiving light. CCD arrays are used for a wide variety of purposes, including astronomy to image distant stars, planets, and space phenomenon, in the medical industry to image biological matter or phenomenon on a microscopic level, and for imaging objects in contexts such as manufacturing production lines. This is to mention only a few applications, and numerous others exist in a wide variety of industries.

CCD arrays and related circuit boards are often housed within a camera head enclosure. The enclosure protects the pixel array and related circuit boards from damage due to dust, debris, shock, impact, and/or ambient conditions. Due to the fact that CCD and other pixel arrays are required for a wide range of uses, the nature and characteristics of the pixel arrays commercially available vary correspondingly. CCD arrays can differ in terms of their physical size and dimensions, their sensitivity to received light, the light wavelength to which they are sensitive, the speed at which they are clocked to extract an electronic signal(s), and other factors. In addition, a CCD array may be associated with one or more related circuit boards serving various functions, such as driving the CCD array, or pre-amplifying signals to and from the CCD array, among others. As a result of the need to select the desired pixel array and related circuit boards needed to provide target functionality, it is usually required to make a custom camera head enclosure to house a CCD array and related circuit boards. Such custom-designed and custom-made camera head enclosures can be prohibitively expensive. While the expense of making a custom camera head enclosure may be acceptable if the purpose to which the camera is to be used is static, this is seldom the case. Instead, if the user desires to use a camera for a different purpose other than that originally intended, the user will require an entirely different camera head to be designed and made. This necessitates the expense of designing and building an entirely different camera head enclosure to house the pixel array and circuit boards required for the new application. Thus, there is a pronounced and longstanding need for a camera head enclosure that enables ready replacement and/or interchangeability of elements of the camera, without requiring redesign or reconfiguration.

SUMMARY OF THE INVENTION

The disclosed apparatus, in its various embodiments, overcomes the disadvantages of previous camera head enclosures noted above.

In one embodiment, a camera head enclosure apparatus in accordance with the invention comprises at least one carrier defining a mounting portion configured to receive and secure a circuit board. The invention can also comprise front and rear plates on opposing front and rear sides of the carrier(s). The front and rear plates have heat fins thereon to sink heat generated by the circuit boards to ambient air. The front and rear plates and carrier(s) define aligned apertures for receiving a bolt or other connection device, to hold the front and rear plates and carriers together to at least partially enclose the circuit boards mounted to respective carrier(s). The carrier(s) can be configured as U-shaped members, and the apparatus can further comprise one or more cover plates to enclose respective open ends of the U-shaped members. The apparatus can be configured so that the front end of the front plate has a fastening portion defining two inner apertures, spaced slots, and outer apertures. The apparatus can comprise a personality plate which acts as a mounting plate to secure the pixel or CCD array to the rest of the camera head enclosure apparatus. The personality plate is configured appropriately for the pixel or CCD array with which it is to be used. In other words, each personality plate varies in size and the position of its mounting holes so that it can receive and secure a specific pixel or CCD array with which it is associated. Therefore, by the simple expedient of selecting or replacing a personality plate with one appropriate for the pixel array desired for the intended application, different pixel or CCD arrays can be used in the apparatus. The personality plate defines two apertures aligning with those of the inner apertures of the front plate, to receive respective screws or other fasteners to hold the personality plate to the front plate. The CCD or other pixel array can be provided on a chip or circuit board that has apertures defined therein to correspond to outer apertures defined in the personality plate. Two connection strips, standard with many CCD arrays, have parallel, spaced conductive pins that can be inserted through corresponding holes of the CCD array chip or circuit board to make connections thereon, and further through the slots defined in the front plate to make connection to respective connectors to the circuit board mounted to the carrier on the rear side of the front plate. If more than one circuit board is used, then corresponding connectors on the opposite side can be joined with the connectors of the adjacent circuit board, and so on, so that the connection bus formed by the interjoined connectors on front and back sides of the circuit boards in effect runs transversely through the major surfaces of the circuit boards. The apparatus can further comprise an aperture adjustment assembly which permits alignment of the camera aperture with the pixel array to provide the capability to accommodate different pixel arrays which differ by one or more of type, size, and configuration. Because the position of the pixel array on its chips or circuit board varies depending upon the particular unit, the ability to move the aperture and align it with the pixel array permits the CCD array to receive light directly from the object to be observed. The aperture adjustment assembly comprises a back ring, an aperture plate, and a front cover. The back ring can be a planar rectangular configuration with a relatively large central opening defined therein, and defining a plurality of apertures or the like to receive bolts or other fasteners to hold the aperture adjustment assembly together. The aperture plate defines a central opening for permitting light to pass from the exterior of the apparatus therethrough to the pixel array. The aperture plate can include a tube or the like formed integrally therewith, that limits the angle at which light is able to pass through the aperture. In addition, the aperture plate defines scalloped portions in its corner areas to permit a degree of play for alignment of the opening of the aperture plate with the pixel array. The front cover defines a continuous wall to receive and enclose the aperture plate and rear plate. The front cover can define spaced apertures to receive bolts with threaded ends, or another type of fastener, that extends transversely through corresponding apertures of the front plate, carriers, and into threaded holes defined in the rear plate, to hold the entire assembly together. Upon tightening the bolts or other connection devices, the overall assembly can be held together to enclose the pixel array and related circuit boards therein. In addition, the tightening of the bolts or connection devices fixes the position of the aperture plate between the front cover and back ring, to lock registration of the aperture plate's opening to the pixel array.

DETAILED DESCRIPTION OF THE DRAWINGS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements.

Figure 1:
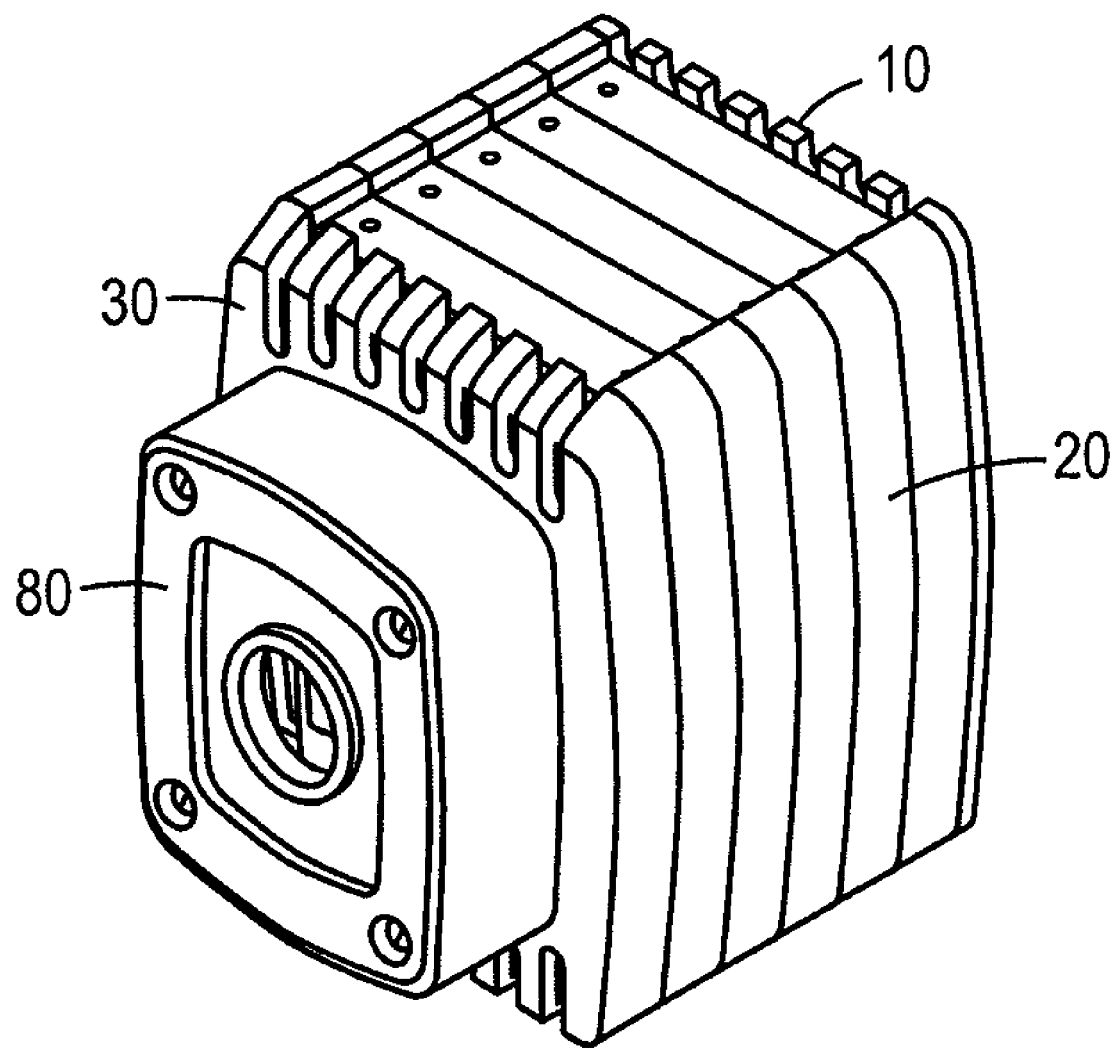
FIG. 1 is a perspective view of a camera head enclosure embodying the invention.
Figure 2:
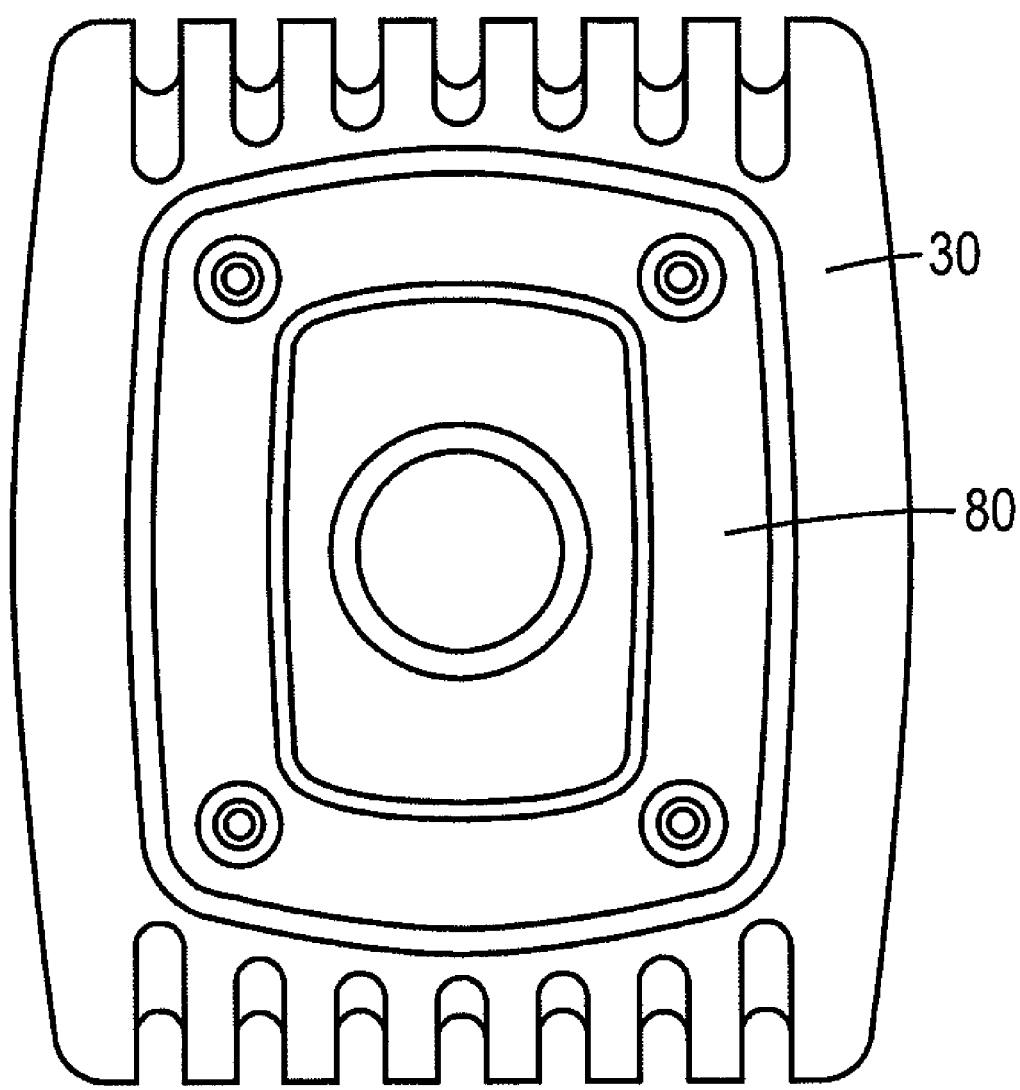
FIG. 2 is a front elevation view of the front of a camera head embodying the invention.
Figure 3:
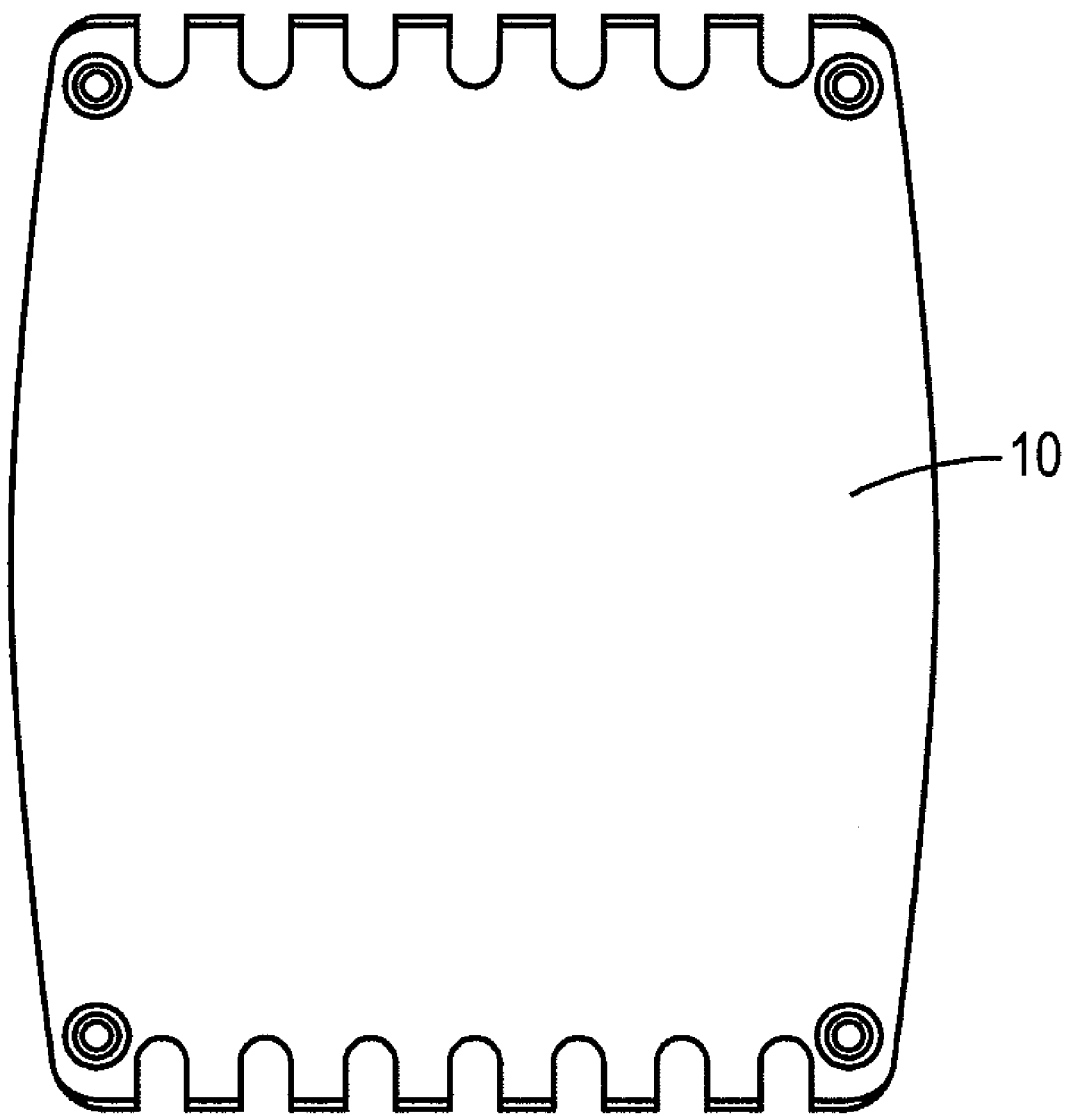
FIG. 3 is a rear elevation view of the back of a camera head embodying the invention.
Figure 4:
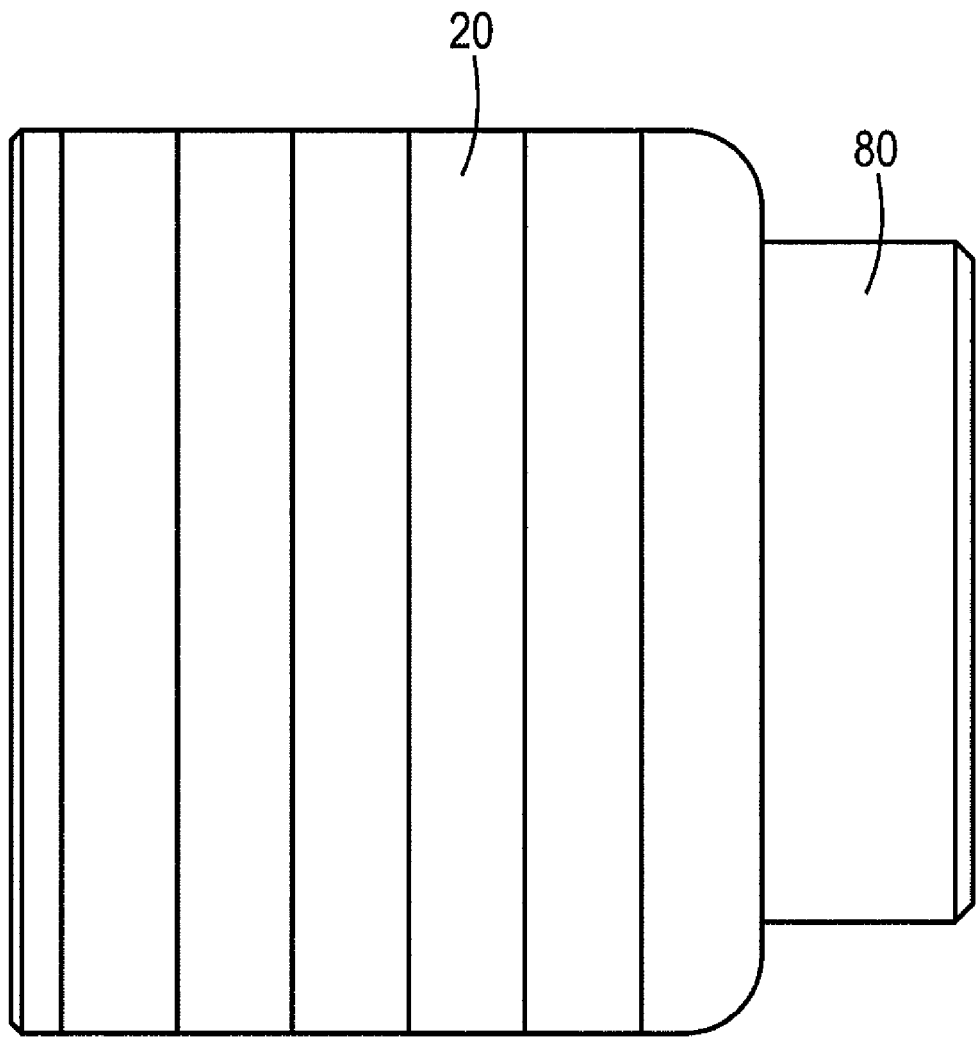
FIG. 4 is a side elevation view of one side of a camera head embodying the invention.
Figure 5:
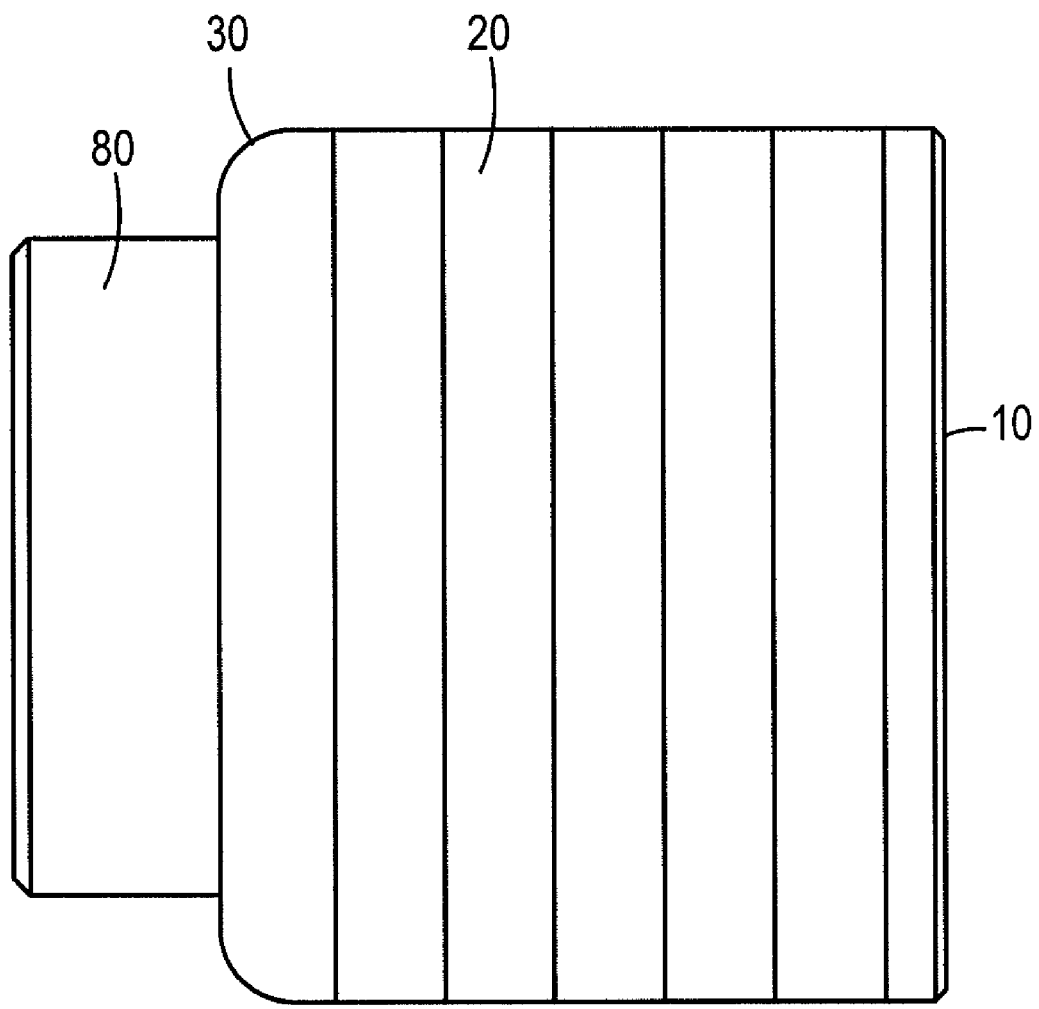
FIG. 5 is a side elevation view of the other side of a camera head embodying the invention.
Figure 6:
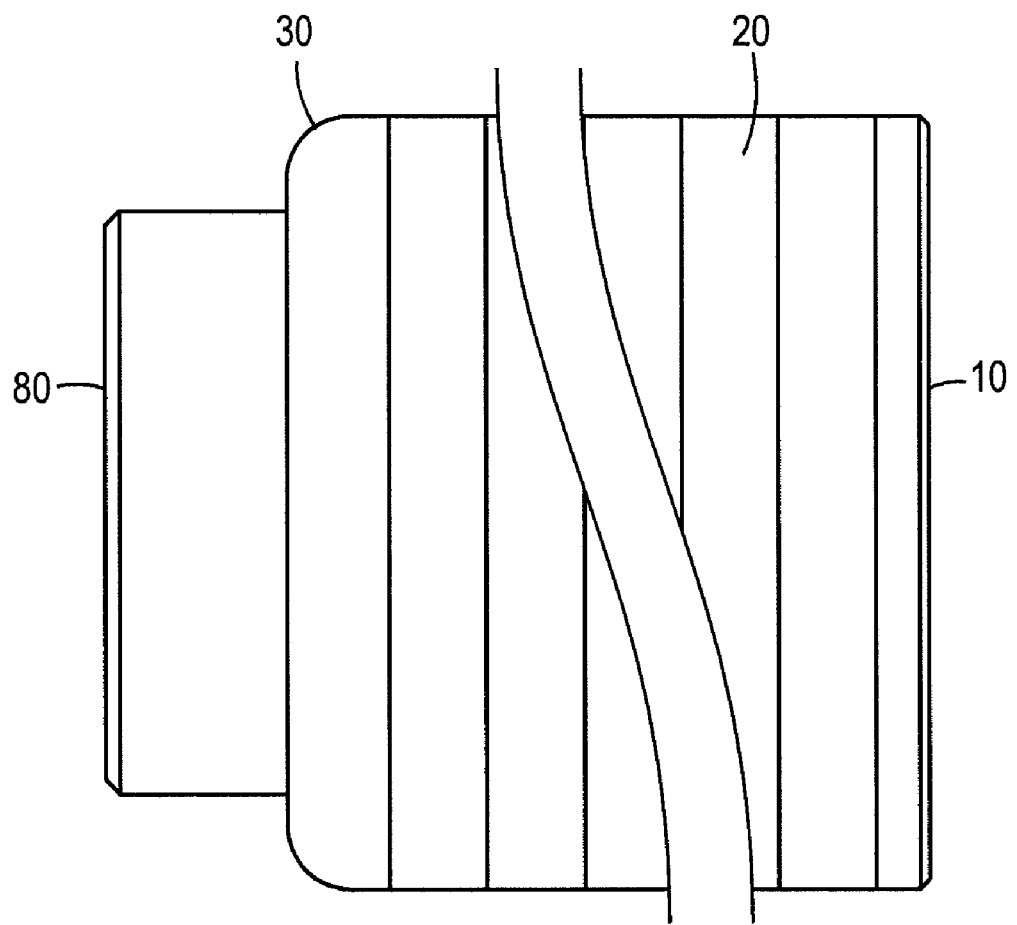
FIG. 6 is a side elevation view of a camera head embodying the invention.
Figure 7:
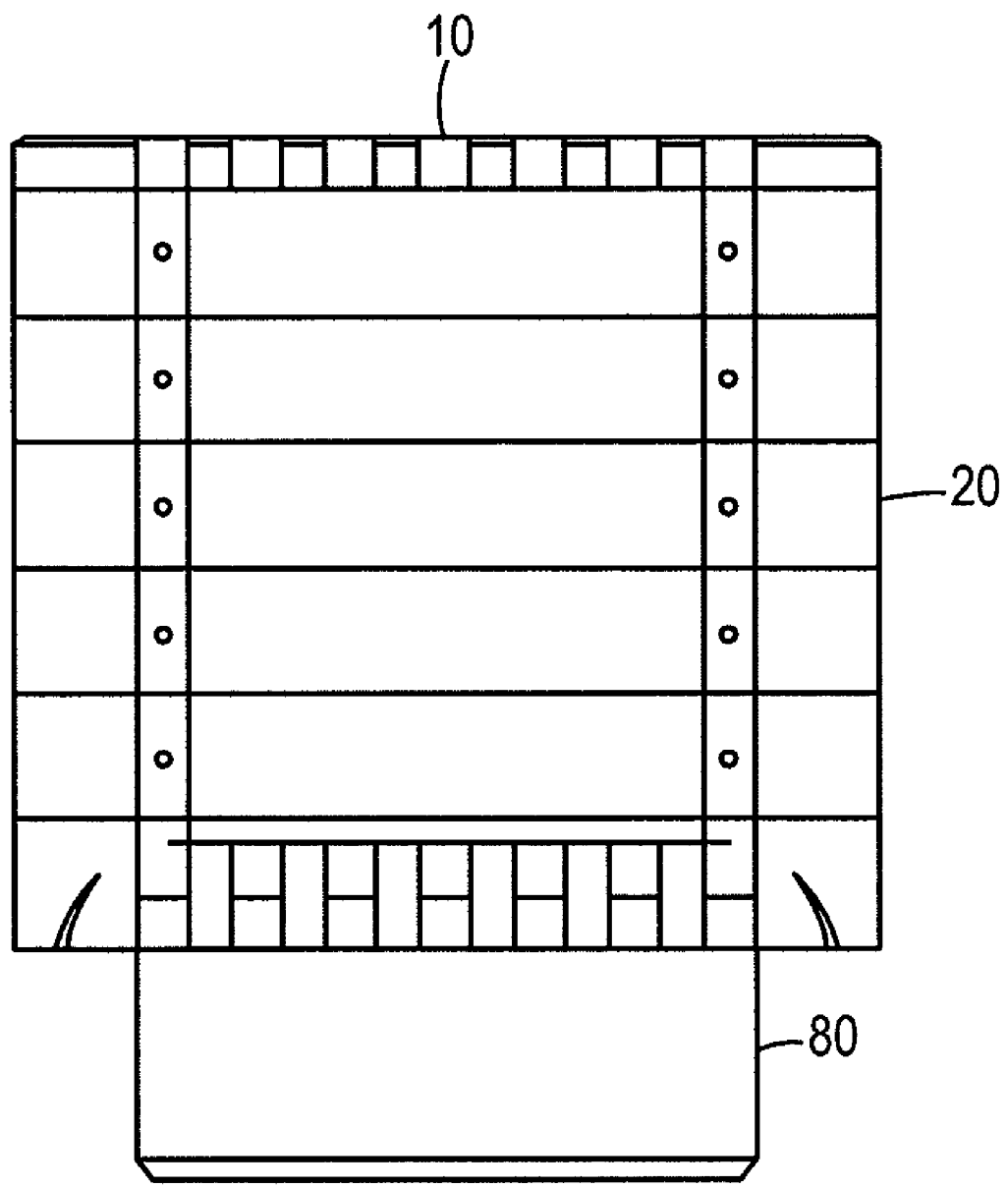
FIG. 7 is a top plan view of the top of a camera head embodying the invention.

Referring now in more detail to the drawings, in which like numerals refer to like parts throughout the several views, FIG. 1 shows a perspective view of a camera head enclosure embodying the invention. A plurality of carriers 20, preferably in a U shape, are aligned and connected to each other. Two of said carriers 20 that are positioned at the two ends of the connection of a plurality of carriers are fastened to a rear plate 10 and a front plate 30 respectively. The front plate 30 is further attached to a front cover 80.

Figure 9:
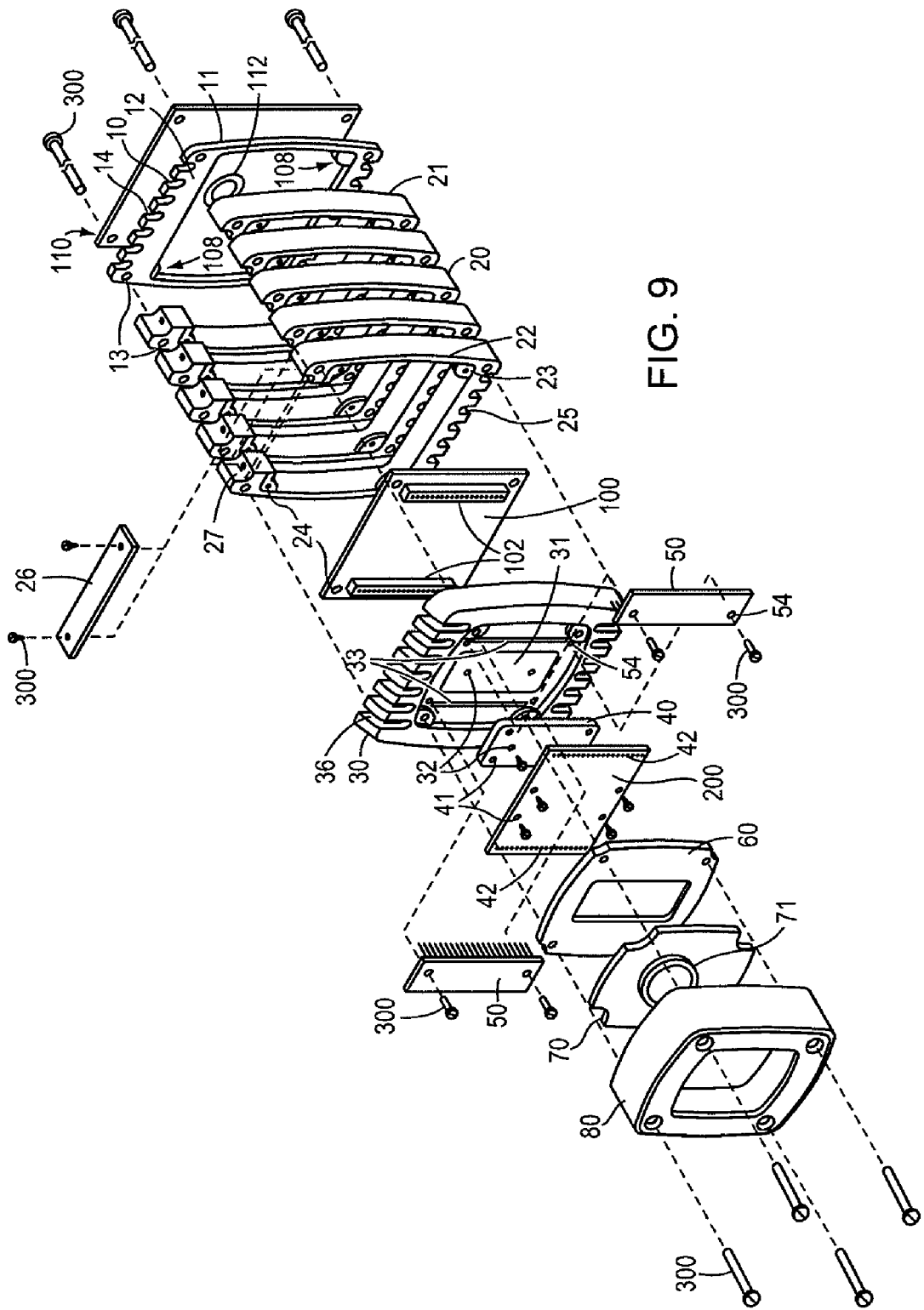
FIG. 9 is an exploded view of a camera head embodying the invention.

Turning to FIG. 9, the rear plate 10 defines a wall surface 111 on the back side of the plate and an engagement portion 12 on the front side of the plate. The engagement portion 12 contains openings 13 aligned with corresponding openings of the carriers. The rear plate 10 also defines an array of heat fins 14 on the top and bottom of the plate to allow circulation of air to sink heat generated by enclosed pixel array and circuit board components from the enclosure.

Each carrier 20 defines a first engagement portion 21 on the back of the carrier and a second engagement portion 22 on the front side of the carrier. A first engagement portion 21 of one carrier is configured for joining with either a second engagement portion 22 of another carrier or the engagement portion 12 of the rear plate 10. In that way a plurality of carriers 20 plus a rear plate 10 may be stacked together via one or more fastener 300 (including a bolt, a screw, a rod, a guide spin, adhesive, or other connection device) fed through aligned openings 13. A carrier 20 further includes mounting portions 23 for mounting a circuit board 100 to the carrier by a fastener going through aligned openings 24. An array of heat fins 25 are formed along the bottom of a carrier 20 to allow air passage for cooling the enclosed circuit boards. A strip 26 may be placed in a bracket 27 on the top of every U-shaped carrier 20 as a separate cover, or can be integrated as part of a carrier, thereby making the carrier closed like a rectangular ring.

The front plate 30 defines a first fastening portion 31 in the middle of the plate for connecting with a personality plate 40 via threaded screws or other fastener 300 fed through matching openings 32. Additional fasteners 300 such as bolts or screws fed through matching openings 41 can be used to mount the pixel array 200 to a personality plate 40. The use of the word 'personality' is thus not being used herein in its ordinary sense, but is instead a figurative reference to the fact that the personality plate accommodates the 'personality' of a pixel or CCD array according to one or more factors, such as its type, size, configuration, etc. The front plate 30 also defines parallel spaced slots 33. Two connector strips 50, standard with most CCD arrays, having parallel spaced conductive pins, are inserted through respective rows of holes 42 in the pixel array 200. The holes 42 are defined by conductive surfaces making electrical connection to the photo-diodes of the pixel array 200. The conductive pins of the connection strip(s) 50 extend further through the slots 33 of front plate 30, and into connectors 102 on the circuit board 100 to make electrical connection with the circuit on the board 100. On its reverse side, the circuit board 100 can have pins electrically connected with the conductors in the holes of the connector 102 on the front side thereof. By means of the pins, the circuit board 100 can be connected with a connector of an additional circuit board (not shown) mounted in the next carrier, and so on, so that the joined connectors together provide a connection bus for providing signals from the pixel array to the circuit boards of respective carriers 20. Similar to the rear plate 10, the front plate 30 defines heat fins 36 on the top and bottom for air passages and dissipation of heat generated by the enclosed pixel array and circuit board components. These fins align with those of the carrier(s) 20 and end plate 10 upon assembly so as to permit passage of air through these elements to cool the camera head enclosure.

The personality plate 40 can be fastened with the front plate 30 via one or more fasteners 300 such as screws, fed through matching openings 32. The front side of this personality plate 40 may be connected to a CCD array chip or circuit board 200 via one or more fasteners 300 (for example, screws) going through aligned mounting holes 41. The size of the personality plate and the position of mounting holes 41 defined therein can be made different to conform to the size and configuration of a particular CCD array chip or circuit board selected by a user. Thus, merely by changing the personality plate 40, the camera head enclosure can be adapted for an entirely different CCD array. The ability to select or replace the pixel array and circuit boards with those appropriate for different applications using relatively minor modifications of changing the personality plate respective 40 and installing one or more related circuit boards in carriers 20, is a great benefit over previous devices of this kind.

A front cover 80, an aperture plate 70, and a back ring 60 are fastened to the front plate 30 as one unit. The back ring 60, which can be in a rectangular shape, is capable of being fastened to the front cover 80 so that the aperture plate 70 is sandwiched between them. The aperture plate 70 defines an opening 71, preferably in a circle shape, in the center of the plate. The opening 71 can be defined by a tube or hollow cylinder portion that extends transversely through the major surfaces of the aperture plate. This tube can be used to limit the angle at which light is permitted to enter the camera enclosure to illuminate the pixel array. The opening 71 is defined in the aperture plate so as to be positioned centrally relative to the pixel array regardless of the particular CCD array selected for use. To that end, the aperture plate 70 contains scalloped portions in the corner areas thereof (although not necessarily limited to the four corners of the ring as shown in FIG. 9) to provide a degree of play to register the aperture relative to the pixel array 200. Fastener 300 such as threading bolts can be inserted through registered apertures of the front cover 80 and back ring 60 to hold the aperture plate 70 in registration with the pixel array 200. In addition, bolts can be extended through registered holes of the aperture assembly, front plate 30, carrier(s) 20, into threaded holes or the like defined in the rear plate 10. Upon tightening the same, the entire assembly is held together. The rear plate 10 can be left open to permit passage of electrically-conductive wires, cable, or the like for connection to an external device such as a camera controller unit. Alternatively, the mounting portions 108 of the rear plate 10 can support and receive a back cover 110 mounted thereto with screws or other fasteners 300. The back cover 110 can have a bushing 112 to permit wires, cable, or the like to extend through the back cover to make connections to an external device such as a camera controller or computer.

In operation, as shown in FIG. 9, almost every plate, carrier or ring in the exploded view may be fastened one to another very easily by means of a fastener fed through the matching holes. Especially, a user may add or delete one or more of the carriers to accommodate his/her need for a variable number of circuit boards. This is advantageous from the standpoint that the circuit boards can be made modular in terms of their functionality. By way of example, and not limitation, one circuit board can be configured to generate control signals to read data from the pixel or CCD array, another circuit board can be configured for storing or buffering the data from the pixel or CCD array, and yet another circuit board can be used to transmit the data to a camera controller for further processing according to a signal generated by such controller. Furthermore, the adjustable size and configuration of a fastening personality plate and the movability of the aperture plate allow a user to choose a CCD from a wide range of sizes. Each piece of the embodiments in FIG. 9, including each plate, carrier and ring, can be made from metal such as aluminum, plastic, or any other suitable material.

Figure 8:
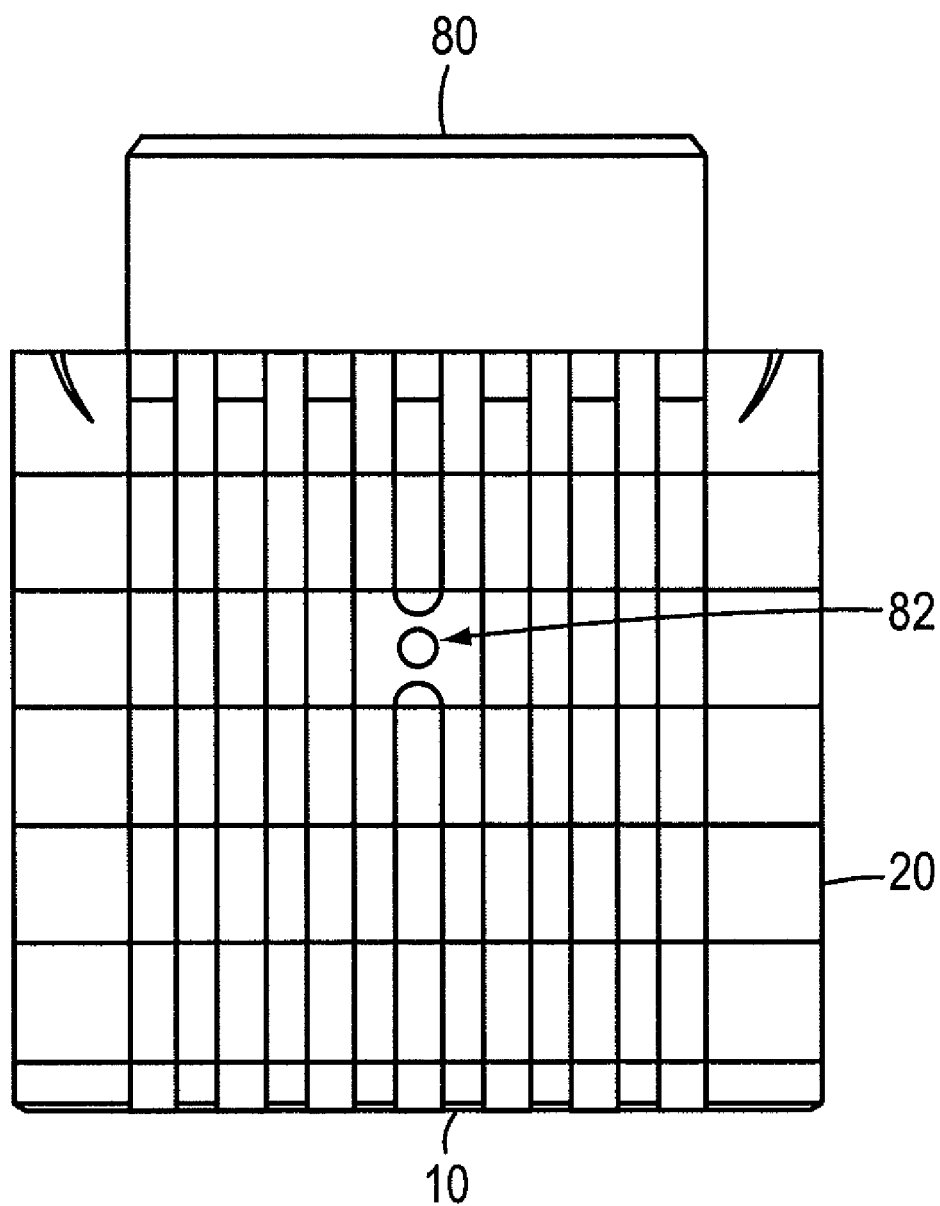
FIG. 8 is a bottom plan view of the bottom of a camera head embodying the invention.

As shown in FIG. 8, one of the carriers 20 can define a threaded hole 82 to receive the mount of a tripod, a mounting bracket, or other support device so that the camera can be supported and aligned relative to the object to be observed by the CCD camera. An external camera controller can generate signals such as clock or timing signals and a power supply which are provided to the pixel array and circuit boards housed within the enclosure. Based on the received signals, the enclosed pixel array and circuit board(s) generate signals provided to the external controller for processing to produce image data.

All other FIGS. 2-7 provide various views of the assembly of a camera head enclosure as shown in FIG. 1. These drawings do not show all the embodiments in the present inventions. Furthermore, each embodiment should not be construed as limited to the description set forth above, but may include a number of alternative variations. For example, plates 26 can have heat sink fins defined thereon to radiate heat away from the enclosure. Numerous other variations are possible without departing from the scope of the invention.

That which is claimed:

1. A camera head enclosure apparatus configured to allow the interchangeability of photo-electric pixel arrays, said apparatus comprising:
    a personality plate, configured to receive and secure a photo-electric pixel array of a specific configuration provided on a chip, said personality plate defining inner and outer apertures;
    a photo-electric pixel array provided on a chip, said photo-electric pixel array chip defining apertures therein, said apertures corresponding with said outer apertures defined by said personality plate to receive respective fasteners to hold said photo-electric pixel array chip to said personality plate; and
    a front plate defining apertures, at least a portion of said apertures comprise inner apertures corresponding with said inner apertures defined by said personality plate to receive respective fasteners to hold said personality plate, and thereby also a photo-electric pixel array chip, to said front plate.

2. A camera head enclosure apparatus comprising:
    a chip having a photo-electric pixel array thereon, said chip mounted to a personality plate;
    at least one carrier;
    a front plate having apertures aligned to at least one second aperture defined in the personality plate, the front plate and personality plate receiving respective fasteners through the apertures thereof to secure the personality plate, and thereby also the chip having the photo-electric pixel array, to the front plate, the front plate joining with the carrier on a first side thereof;
    a circuit board mounted to said carrier on the rear side of said front plate; and
    a personality plate mounted to said front plate; said personality plate configured to receive and secure said chip having said photo-electric pixel array in said camera head enclosure in electrical contact with said circuit board.

3. The camera head enclosure apparatus of claim 2 wherein said personality plate is configured to correspond in size to said photo-electric pixel array chip.

4. The camera head enclosure apparatus of claim 2 wherein the chip having the photo-electric pixel array is selected from among a plurality of chips having respective photo-electric pixel arrays that differ by at least one of type, size, and configuration, and the personality plate is selected from among a plurality of different personality plates as one configured to receive and secure the selected chip.

5. The camera head enclosure apparatus of claim 2 wherein said at least one carrier defines a U-shape, said U-shaped carrier further defining an open end.

6. The camera head enclosure apparatus of claim 5, said apparatus further comprising:
   at least one cover plate covering said open end of said at least one U-shaped carrier.

7. A method for assembling a camera head enclosure apparatus, the method comprising:
   selecting a first photo-electric pixel array from a plurality of photo-electric pixel arrays;
   selecting a first personality plate from a plurality of personality plates, said first personality plate configured to receive and secure said first photo-electric pixel array;
   combining said first photo-electric pixel array with said first personality plate to produce a first combination;
   inserting said first combination into a camera head enclosure;
   selecting a first circuit board associated with said first photo-electric pixel array;
   mounting said first circuit board on a first carrier;
   inserting said first carrier into said camera head enclosure; and
   electrically coupling said first circuit board with said first photo-electric pixel array to assemble the camera head enclosure apparatus.

8. The method of claim 7, said method further comprising the steps of:
   selecting at least one additional circuit board associated with said first photo-electric pixel array;
   mounting said at least one additional circuit board on respective at least one additional carrier;
   inserting said at least one additional carrier into said camera head enclosure; and
   electrically coupling said at least one additional circuit board with said first circuit board.

9. The method of claim 8, said method further comprising the steps of:
   decoupling said first photo-electric pixel array from said first circuit board and said first circuit board from said additional circuit boards;
   removing one first combination, said first circuit board mounted on said first carrier and said additional circuit boards mounted on said additional carriers from said camera head enclosure;
   removing said first and said additional circuit boards from said first and said additional carriers;
   selecting a second photo-electric pixel array from a plurality of photo-electric pixel arrays;
   selecting a second personality plate from a plurality of personality plates, said second personality plate configured to receive and secure said second photo-electric pixel array;
   combining said second photo-electric pixel array with said second personality plate to produce a second combination; and
   inserting said second combination into said camera head enclosure in place of said first combination.

10. The method of claim 9, said method further comprising the steps of:
    selecting a second circuit board associated with said second photo-electric pixel array;
    mounting said second circuit board on a second carrier;
    inserting said second carrier into said camera head enclosure; and
    electrically coupling said second circuit board with said second photo-electric pixel array.

11. The method of claim 10, said method further comprising the steps of:
    selecting at least one additional circuit board associated with said second photo-electric pixel array;
    mounting said at least one additional circuit board on respective at least one additional carrier; and
    inserting said at least one additional carrier into said camera head enclosure; and
    electrically coupling said at least one additional circuit board with said second circuit board.

12. A device within a camera head enclosure comprising:
    a personality plate,
    wherein the personality plate is configured to receive a chip having a photo-electric pixel array;
    wherein the personality plate is further configured to secure the chip to the personality plate;
    wherein the personality plate is further configured to secure to a camera head enclosure; and
    wherein the personality plate defines at least one aperture aligned with a corresponding aperture of the chip having the photo-electric pixel array, the personality plate and chip receiving a respective fastener through apertures thereof to hold the chip securely to the personality plate.

13. The device of claim 12 wherein the personality plate is configured to correspond in size to the chip having the photo-electric array.

14. The device of claim 13 wherein the personality plate further defines a second set of apertures to receive fasteners to hold the personality plate, and thereby also the chip having the photo-electric pixel array, to a part of the camera head enclosure.

\* \* \* \* \*